Aug. 4, 1925.

E. C. MORRISON

INSECT DESTROYER

Original Filed March 20, 1920  4 Sheets-Sheet 1

1,548,476

Inventor
Everett C. Morrison.
by Elliott & Thurman
Att'ys.

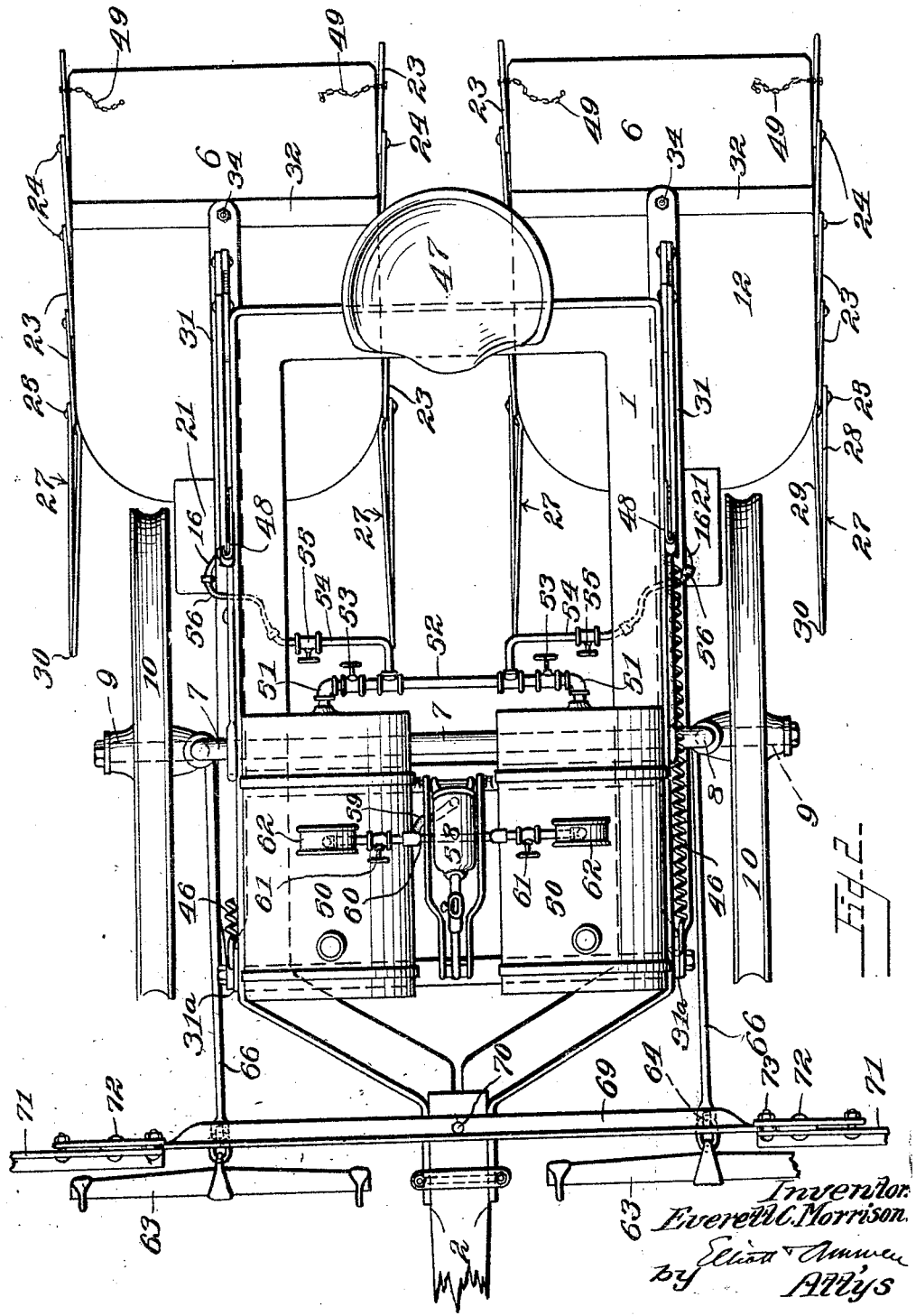

Aug. 4, 1925. 1,548,476
E. C. MORRISON
INSECT DESTROYER
Original Filed March 20, 1920 4 Sheets-Sheet 3
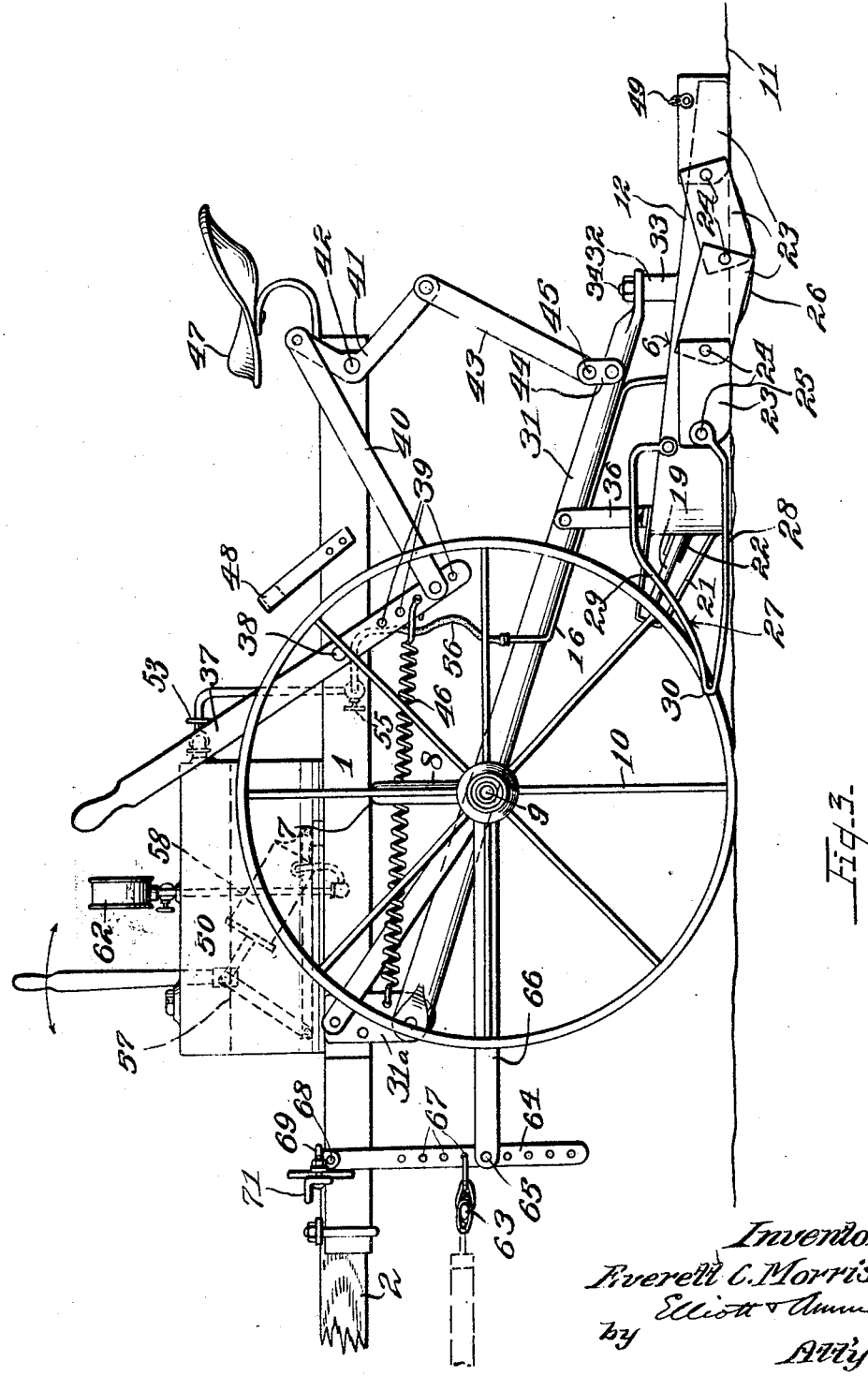

Aug. 4, 1925.  
E. C. MORRISON  
INSECT DESTROYER  
Original Filed March 20, 1920  
1,548,476  
4 Sheets-Sheet 4
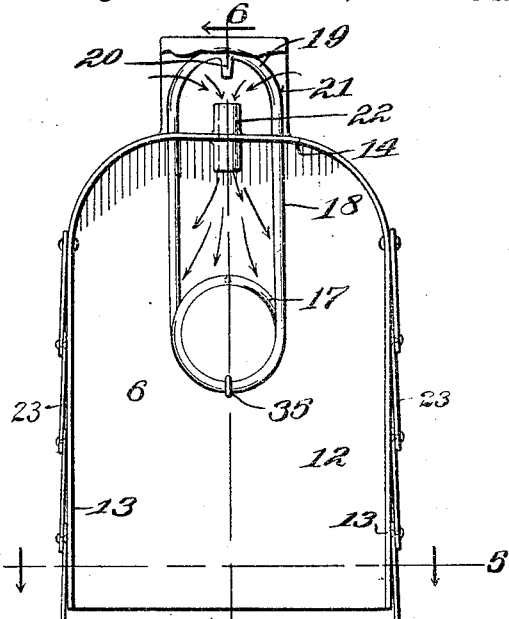
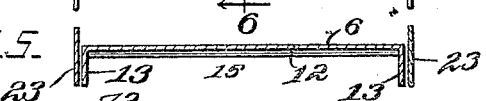
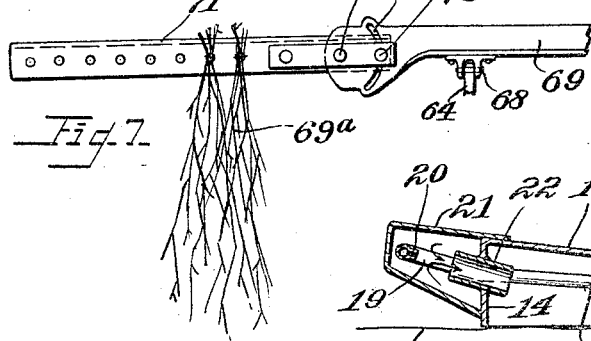
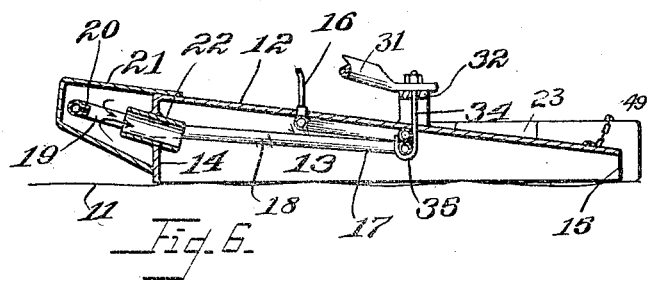
Inventor:  
Everett C. Morrison.  
by Elliott & Annum  
Att'ys.

Patented Aug. 4, 1925.

1,548,476

UNITED STATES PATENT OFFICE.

EVERETT C. MORRISON, OF ST. LOUIS, MISSOURI.

INSECT DESTROYER.

Application filed March 20, 1920, Serial No. 367,320. Renewed December 31, 1924.

*To all whom it may concern:*

Be it known that I, EVERETT C. MORRISON, a citizen of the United States, residing in the city of St. Louis and State of Missouri, have invented new and useful Improvements in Insect Destroyers, of which the following is a specification.

This invention relates to apparatus for cultivating growing plants, such as cotton. As is well known, growing cotton is subject to attack by an insect known as boll weevil, which is very destructive. The general object of the present invention is to provide a very simple apparatus or machine which operates in such a way as to destroy insects by means of intense heat, at the same time providing means for preventing any injury to the plants. The apparatus is so constructed that it may be moved down the rows of cotton plants and operates to destroy insects lying on the ground between the rows. If desired, special means may be provided for brushing or shaking the plants to dislodge the insects so that they are cast upon the ground in front of the heaters which subject them to a destructive heat. Although I do not limit myself to the particular means which I illustrate for developing the intense heat required in the heaters, I may accomplish this by means of a liquid fuel carried in reservoirs on the frame of the machine or apparatus; under these circumstances I produce a flame within the heater and move the heater along close to the ground, at the same time I provide means associated with the heater or heaters to prevent the flame from issuing laterally from the heaters in such a way that it might injure the growing plants. I also provide simple means for delivering fuel to the heaters under pressure so as to produce a very active combustion of the fuel, thereby generating an intense heat which is very destructive to insect life. The burner or burners of the heaters are so constructed as to insure the complete combustion of the fuel. In this way I prevent any of the liquid fuel passing onto the ground, which might be injurious to the plants. I also provide an arrangement of reservoirs for the fuel which enables the apparatus or machine to be continuously used, that is to say, I provide a piping arrangement from the reservoirs to the burners which will permit of the removal of the reservoirs when desired to make repairs upon the same, leaving the remaining reservoirs intact so that the machine can still be used. One of the objects of my invention is to provide means for brushing or beating the plants automatically as the machine advances so as to dislodge the insects and also to provide means for guiding the branches of the plants which lie near the ground so that they will not come in contact with the heaters as they pass between the rows of plants. Another object of my invention is to construct the heaters and the guards which protect the plants in such a way that they may be readily held up off of the ground when the machine is being moved from place to place, and when the machine reaches the end of a row at the edge of the cotton field. My apparatus also includes simple means for developing air pressure in any one or all of the fuel reservoirs and for indicating the pressure in the different reservoirs.

Further objects of the invention will appear hereinafter.

The invention consists in the novel features, and in the general combination of parts to be particularly described hereinafter, all of which contribute to produce a simple and efficient cultivator. A preferred embodiment of my invention will be particularly described in the following specification, while the broad scope of my invention will be pointed out in the appended claims.

In the drawing,

Figure 2 is a plan of the machine shown in Figure 1, but upon an enlarged scale, certain parts being broken away;

Figure 3 is a side elevation of the machine as illustrated in Figure 2, certain parts being broken away and omitting other parts;

Figure 4 is a bottom plan view of one of the heaters partially broken away and particularly illustrating the construction of the burner and details of the type of side guards which I may employ for confining the flame of the burner;

Figure 5 is a cross section taken on the line 5—5 of Figure 4 and further illustrating details of the construction;

Figure 6 is a longitudinal section taken on the line 6—6 of Figure 4; and

Figure 7 is a detail side elevation, looking in a front and rear direction and showing details of the means which I may employ for brushing or beating the plants automatically as the machine advances.

Figure 1:
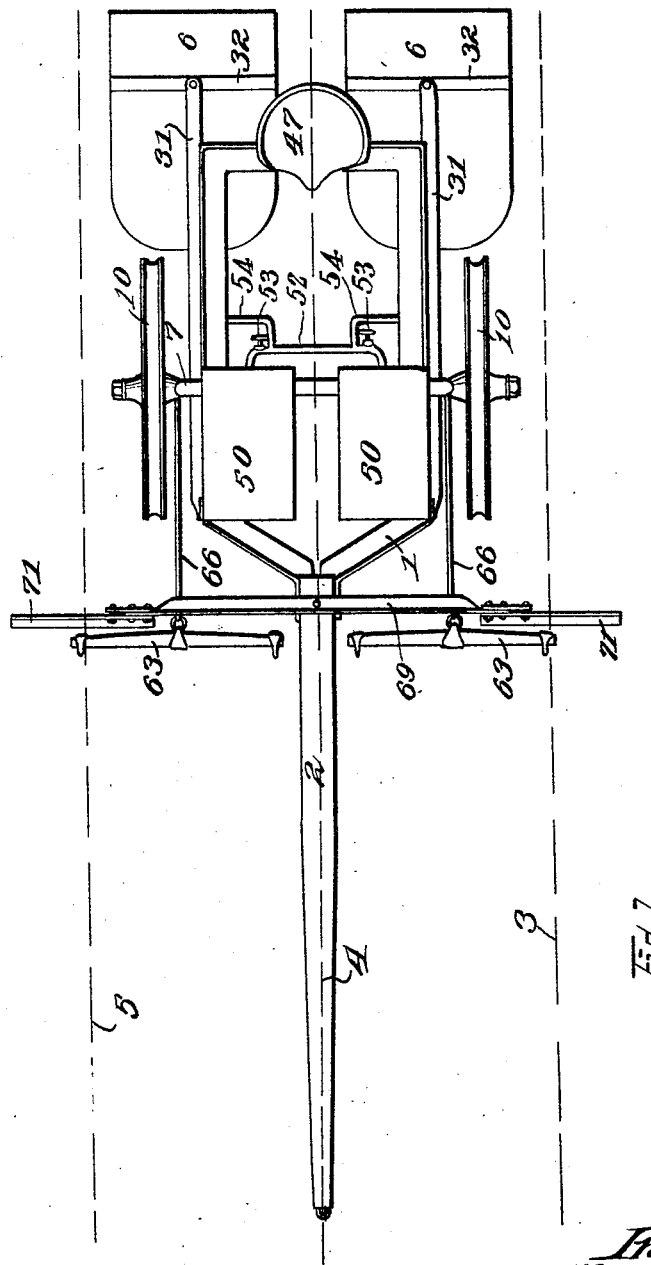
Figure 1 is a plan of the apparatus or machine, and illustrating a preferred construction which enables the machine to cultivate one row and parts of two other rows simultaneously.

Before proceeding to a detail description of the type of machine which I have illustrated, I desire to say that the apparatus includes a heater or heaters in which an intense heat may be developed by any means desired, and these heaters are preferably mounted on a frame of some kind which will enable them to be moved along between the rows of plants. As the heater advances between two adjacent rows, the plants in advance of the heater are shaken or brushed automatically or otherwise, so that the insects upon the plants are cast on the ground in front of the heater where they are destroyed as the heater passes over them or adjacent to them. It should be understood, that although I develop an intense heat in the heater or heaters the plants are perfectly protected from the heat so that they are not injured in any way, and furthermore, in practice the heaters may be advanced at the speed of a horse walking, so that the period of time during which the plants are exposed to heat is very short indeed. In other words, I subject the ground between the rows of plants to an intense heat for a few seconds which is sufficient to effectively destroy insect life without injuring the plants.

I shall now describe a preferred type of apparatus or machine for carrying out the purposes of my invention.

The frame 1 of the machine may be of any suitable construction and is preferably provided with a tongue 2 at the forward end so that the machine may be drawn along by two horses, each horse walking in the space between two adjacent rows of the plants, see Figure 1 in which 3, 4 and 5 represent the rows of plants. In this type of machine I provide a heater 6, which passes between the rows 3 and 4 and a similar heater 6 for passing between the rows 4 and 5. The frame 1 is mounted upon a suitable axle 7 the body of which is attached to the underside of the frame 1, the ends of the axle having substantially vertical extensions 8 terminating below in arms 9 to which the wheels 10 are attached.

The heaters 6 are attached to the frame in any suitable manner, so that as the frame advances they move along close to the ground line 11; in fact they preferably rest upon the ground. Each of these heaters preferably consists of a shallow inverted pan (see Figs. 4 and 6) which pan is closed on its upper side by cover wall or roof 12 and is provided with substantially vertical side walls 13 and a forward wall 14; the heater is of greatest height at its forward end and the cover 12 is preferably inclined as shown, so that the heater tapers toward its rear end at which an outlet 15 is formed. Within each heater I provide means for developing an intense heat. In the present instance this is accomplished by means of a burner for liquid fuel which is so constructed as to insure an ample supply of air to support the rapid rate of combustion which is incidental to the use of pressure in forcing the fuel through the burner. The burner is preferably constructed so as to include a vaporizer which is subjected to heat from the flame so that the liquid fuel is thoroughly vaporized before it is consumed by the flame. For this purpose I may admit the fuel through a fuel supply pipe 16 which passes through the upper wall 12 of the heater and this pipe connects directly with a coil 17 disposed against the under side of the roof or cover 12. This coil 17 has integral extensions 18 which extend forwardly and pass beyond the forward wall 14 of the heater at which point they unite to form a loop 19 which is provided on the central line of the heater with a burner nozzle 20. This loop 19 and the nozzle 20 are located within the guard 21 formed of sheet metal like the body of the heater and this guard is open at the sides so as to permit a free influx of air as indicated by the arrows in Figure 4. Through the wall 14 and in alignment with the nozzle 20 I provide a mixing chamber which may be formed on the interior of a tube or sleeve 22. With this construction it will be evident that as the inflammable vapors issue under pressure from the nozzle 20 they are projected in a stream through the mixing chamber within the sleeve 22; as they pass from the inner end of the tube 22 they are ignited by the flame which extends from this point toward the outlet 15 at the rear end of the heater. It will be observed that the coil 17 and extensions 18 are in a position to be highly heated by the flame, the result being that thorough vaporization of the fuel takes place before it arrives at the nozzle 20.

Guards of any suitable construction are provided for preventing injury to the plants in the rows 3, 4 and 5. In the present instance for this purpose, I have simply shown guards which are associated with the heaters and constructed in such a way as to insure that the flame will be confined at the side walls of the heater, that is to say, these guards prevent any possibility of the flame being projected laterally past the side walls 13, of the heater in such a way as to injure the plants. These guards are very clearly shown in Figures 3 and 4, from which it will be seen that they are of flexible form which enables them to follow any irregularities in the contour of the earth over which the heater is passing. For this purpose these guards preferably consist of a plurality of plates 23 which overlap each other in succession and are connected together by pivots or rivets 24, the foremost plate being attached to the side wall 13 of the heater by a suitable rivet or pivot 25. In Figure 3 I illustrate the manner in which these plates will operate to cut off an opening under the edge of the side wall of the heater, which might be formed by a depression 26 in the earth.

In order to prevent the branches from the rows of plants from coming in contact with the forward end of the heater, and in order to lift such branches over the heater, I provide each heater with a pair of guides 27 which may be constructed of round iron or piping including a substantially horizontal extension 28 which rests upon the ground, and an upwardly inclining extension 29, these extensions being united forwardly by a small nose 30 lying near the ground line. This nose 30 should be near enough to the ground to insure that branches will pass over the nose and be guided upwardly by the extension 29. It should be understood that these heaters 6 rest lightly upon the ground and are drawn along by the machine as it advances. I provide means however, for raising the heaters so as to hold them off of the ground when desired, as would be necessary when the cultivator is being taken to or from the field. This means is preferably constructed so that it does not hold the heaters rigidly in position when they are on the ground. In order to accomplish this I may provide a heater arm 31 which is pivotally attached at its forward end to the bracket-plate 31ª on the frame 1 (see Fig. 3). These arms extend rearwardly and incline downwardly, the rear end of each arm being attached to a bridge-bar or strongback 32 which extends across the cover of each heater. The ends of these strong-backs are formed into feet 33 which are welded to the cover of the heater near the side walls 13. These strong-backs keep the heaters in shape and prevent them from sagging under the intense heat. This bracing effect is augmented by a hook-bolt 34 which attaches the rear end of the arm 31 to the strongback, by reason of the fact that the lower end of the hook-bolt 34 is formed into a hook 35 which catches the under side of a portion of the vaporizer coil 17 (see Fig. 6). From this organization of parts it will be evident that the hook-bolt 34 performs the double function of holding up the coil 17 and bracing the middle portion of the cover of the heater; in addition, it also attaches the heater to the arm 31. The forward end of each heater is also attached to the arm 31 by suitable braces 36 (see Fig. 3). The arms 31 may be held raised at will by means of levers 37, provided respectively at opposite sides of the machine and mounted on a pivot 38 on the frame 1. The lower end of each lever is provided with a plurality of openings 39 for attaching a link 40 the rear end of which connects to the upwardly extending arm of a bell crank lever 41 pivoted at 42 on the frame. The lower arm of the bell crank lever 41 connects by a long link 43 and a short link or shackle 44 with the lower end of the arm 31. It will be evident that a flexible joint is formed at the pivot bolt 45 which connects the links 43 and 44 and this insures a slight freedom of movement of the heaters in passing over the ground, that is to say, the arms 31 may rise and fall slightly so as to follow the contour of the ground line. The heaters do not bear with their full weight upon the ground by reason of the fact that I provide means for counterbalancing them. This means is preferably in the from of a long coil spring 46 attached to each lever 37 and extending forward to the bracket-plate 31ª to which the forward end of the arm 31 is pivotally attached. The driver of the vehicle sitting on the seat 47 may pull the levers 37 in a rearward direction and this will swing the arms 31 upwardly. The levers 31 may be swung far enough to the rear to secure them under their corresponding hooks 48 which are mounted on the frame 1. In order to lift the guards composed of the plates 23 off of the ground, I provide the rear plate of each guard with a short chain 49 which is attached at any suitable point to the roof 12 of the heater.

Any liquid fuel may be provided, such as gasoline or alcohol, or indeed, if desired, gas could be employed instead of liquid fuel. I prefer however, to use liquid fuel, and provide a plurality of reservoirs 50 supported in any suitable manner on the frame 1. Suitable means is provided for connecting these reservoirs to the burner pipes 16 so that any of the reservoirs may supply both of the heaters. In the present instance I have simply shown two reservoirs 50. These reservoirs are provided with outlet connections 51 which lead to a manifold 52 (see Fig. 2) each connection 51 including a valve 53 for cutting off communication to the manifold at will. From the manifold 52 a fixed pipe 54 extends toward each side of the machine and each of these pipes is provided with a valve 55; beyond the valve a flexible hose 56 connects the pipe 54 to the heater pipe 16. These heater pipes 16 extend up along the arms (see Fig. 3), so as to enable a relatively short flexible hose to be employed. With this organization of reservoirs and pipe connections it will be evident, that by closing one of the valves 53 its corresponding reservoir can be removed, if desired, for the purpose of making repairs.

Any suitable means may be provided for developing pressure in the liquid fuel in delivering it to the heaters. For this purpose I may provide means for forcing compressed air into the reservoirs above the level of the fuel which is located at the line 57 in Figure 3. This may be accomplished by means of a small air compressor 58 which may be mounted on the machine between the two reservoirs (see Fig. 2), the delivery pipe 59 of this compressor being connected to a manifold 60 delivering air to either of the reservoirs. This manifold is provided with a valve 61 which enables the compressed air to be cut off from either reservoir at will if it is necessary to disconnect a reservoir as suggested. In addition to this, each reservoir is provided with a pressure gage 62 to indicate the pressure in the air chamber in the reservoirs.

With a machine constructed as described, the plants in advance of the machine may be shaken or beaten by any means so as to throw down the boll weevil or other insects, but I prefer to provide automatic means for doing this. Any suitable automatic means may be provided. In the present instance I have illustrated means for utilizing the movement of the single trees to effect the brushing of the plants. In order to accomplish this the single trees 63 (see Fig. 2) to which the horses are attached, are connected to a lever 64 which is pivotally attached at 65 to the forward end of bars 66, the rear end of which is attached to the arm 9 of the axle. Each of these levers 64 is provided with a plurality of openings 67 which enable the single tree to be attached at any height desired and either above or below the pivot 65. The upper end of each lever 64 is pivotally attached at 68 to a cross-bar 69 which extends transversely of the machine and is pivotally attached at 70 on the upper side of the tongue 2. With this construction it will be evident that the pull of the horses on the single trees will cause a vibration in the cross arm 69. To the ends of the cross arm 69 I attach brushes or branches 69ª of twigs or bushes which extend downwardly so as to strike and brush the plants in the rows. If desired, these brushes 69ª may be attached on an arm 71, the position of which may be adjusted to suit the height of the plants. For this purpose the arm 71 may be attached to the end of the cross arm 69 by pivot 72 and may be provided with an adjusting bolt 73 running in a slot 74 formed in the end of the cross arm 69 (see Fig. 7).

In order to brush or beat the middle row 4 of cotton, brushes similar to the brushes 69ª may be attached to the tongue 2 or to the forward portion of the frame 1. However, as the tongue 2 and the horses pass very close to the middle row 4, the sides of the horses will usually be found to be effective in brushing off the insects from this row.

I shall now describe briefly the mode of operation of the machine.

As the machine is driven down the rows of plants, the plants will be brushed in the manner just described so as to cast off the boll weevil or other insects which then fall upon the ground. As the machine progresses the insects upon the ground will be passed over by the heaters 6, 6. The intense heat generated by these heaters kills the insects. As the heaters advance, the guides 27 guide the side branches of the plants up over the heaters. The pressure of the air in the reservoirs above the level 57 of the liquid fuel forces the fuel down under pressure through the fuel pipes 16 to the vaporizers of the burners including the coils 17 and their extensions 18. The vaporized fuel issues from each nozzle 20 and is mixed with air in the mixer 22 before being ignited at the flame beyond the sleeve 22. The guards 21 protect the nozzles 20 from coming in contact with clods of earth or other obstructions on the ground. The guards which are formed of the plates 23 are flexible and run along on the surface of the ground adapting themselves to any unevennesses or depressions in the contour. In this way they keep the heaters substantially closed at their side walls 13 and prevent the flame from passing laterally toward the plants. If it is desired to repair one of the reservoirs, it can be disconnected and its corresponding valves 53 and 61 closed so that the remaining reservoir can be made to operate in the regular way.

By means of the levers 37 the driver may raise the arms 31 which carry the levers so as to lift the heaters 6 clear of the ground. It is desirable to do this in driving the machine when it is not passing along the rows of plants.

It is understood that the embodiment of the invention described herein is only one of the many embodiments my invention may take, and I do not wish to be limited in the practice of my invention nor in my claims, to the particular embodiment set forth.

What I claim is:

1. In a machine for destroying insects, the combination of a wheeled frame constructed to be moved down a row of plants, heaters in the form of inverted pans carried by the frame so as to be moved by the frame close to the ground, a burner under each pan for generating heat, flexible guards attached at the sides of the pan so as to run along on the ground line and prevent the flame from the burners from passing laterally from under the pans, and toward the plants.

2. In a machine for destroying insects, the combination of a wheeled frame constructed to be moved down a row of plants, heaters in the form of inverted pans carried by the frame so as to be moved by the frame close to the ground, a burner under each pan for generating heat, flexible guards attached at the sides of the pan so as to run along on the ground line and prevent the flame from the burners from passing laterally from under the pans, and toward the plants, and means for brushing the plants to dislodge the insects in advance of the pans.

3. In a machine for destroying insects, the combination of an inverted pan, a frame for dragging the pan along over the earth between the rows of plants, means for generating a flame under the pan, said pan having side walls, and guards formed of a plurality of flexibly connected plates adjacent the side walls of the pan and adapted to maintain engagement with the ground line and prevent the flame from the burner from projecting beyond the side walls.

4. In a machine for destroying insects, the combination of a wheeled frame, heaters carried by the frame so as to move along the ground, means for generating a flame in the heaters to kill insects on the ground, flexible guards carried at the sides of said heaters to protect the rows of plants, and means for holding said heaters and guards, at will in an elevated position.

5. In a machine for cultivating plants, the combination of a wheeled frame, heaters resting upon the ground and connected to the frame so as to be dragged along by the frame between the rows of plants, a cross-bar carried by the frame and having means for brushing the plants in advance of the heaters for dislodging the insects and casting the same on the ground before the heaters, and means for vibrating the cross-bar as the frame advances, said means consisting of single-trees connected with the cross-bar so that the movement of the horses drawing the wheeled frame produces a vibration in the cross-bar.

6. In a horse-drawn machine of the kind described, the combination of a frame, a lever mounted at each side of the frame, a single-tree attached to each lever whereby the pull of the horses tends to vibrate the levers and a cross-bar attached to the levers, said cross-bar carrying means for brushing the plants as the cross-bar vibrates, and heaters passing along close to the ground and carried by said frame.

In testimony whereof, I have hereunto set my hand.

EVERETT C. MORRISON.